Dec. 20, 1966 W. W. QUIST ET AL 3,292,783
LUMBER SORTER AND STACKER APPARATUS
Filed Jan. 28, 1964 10 Sheets-Sheet 4
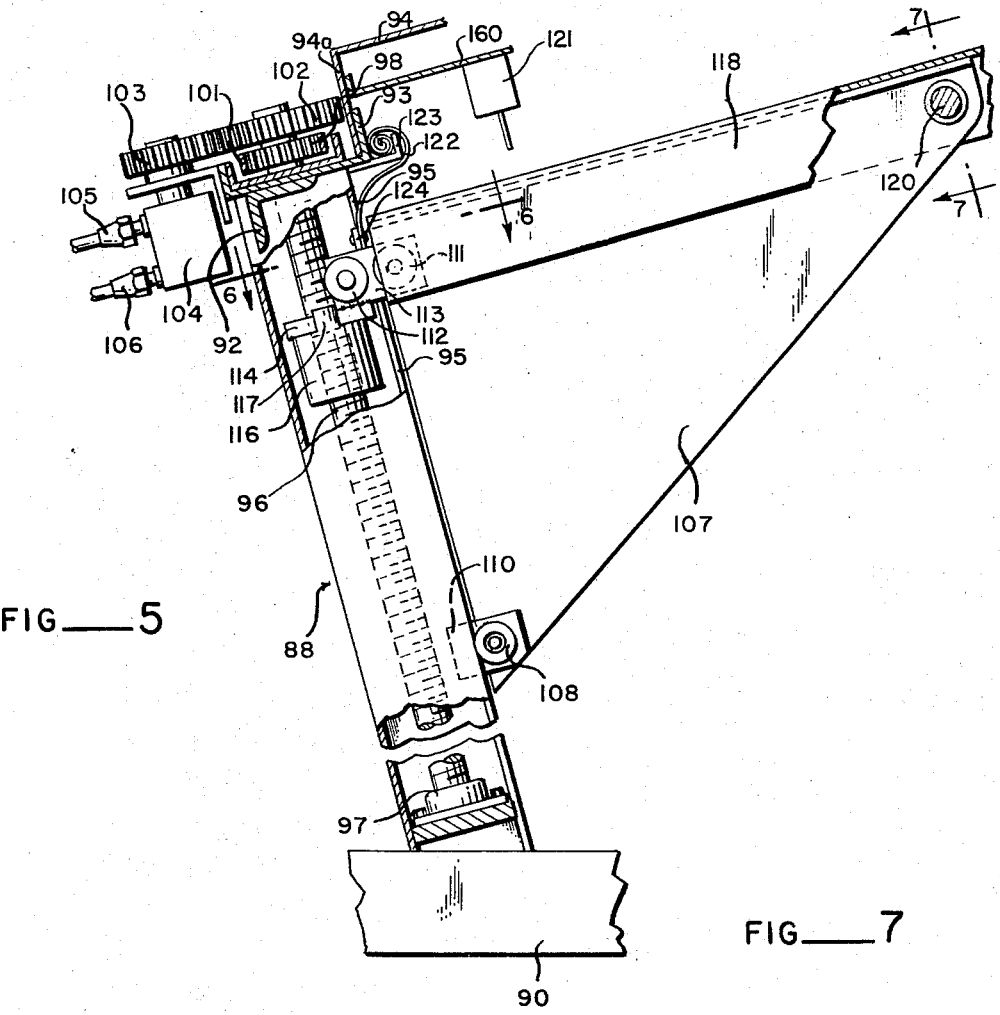
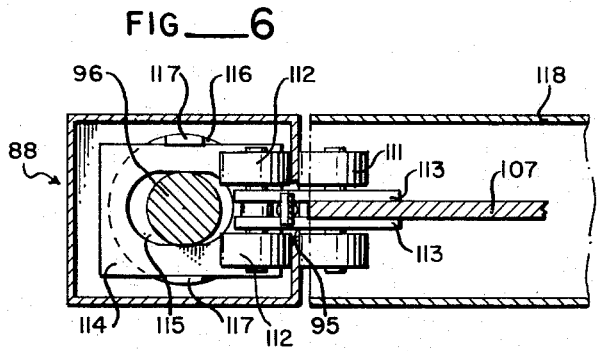
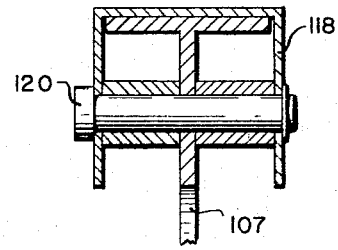
WILTON W. QUIST
KENNETH W. BULLOCK
INVENTORS
BY Seed & Berry
ATTORNEYS Dec. 20, 1966  W. W. QUIST ETAL  3,292,783
LUMBER SORTER AND STACKER APPARATUS
Filed Jan. 28, 1964  10 Sheets-Sheet 5

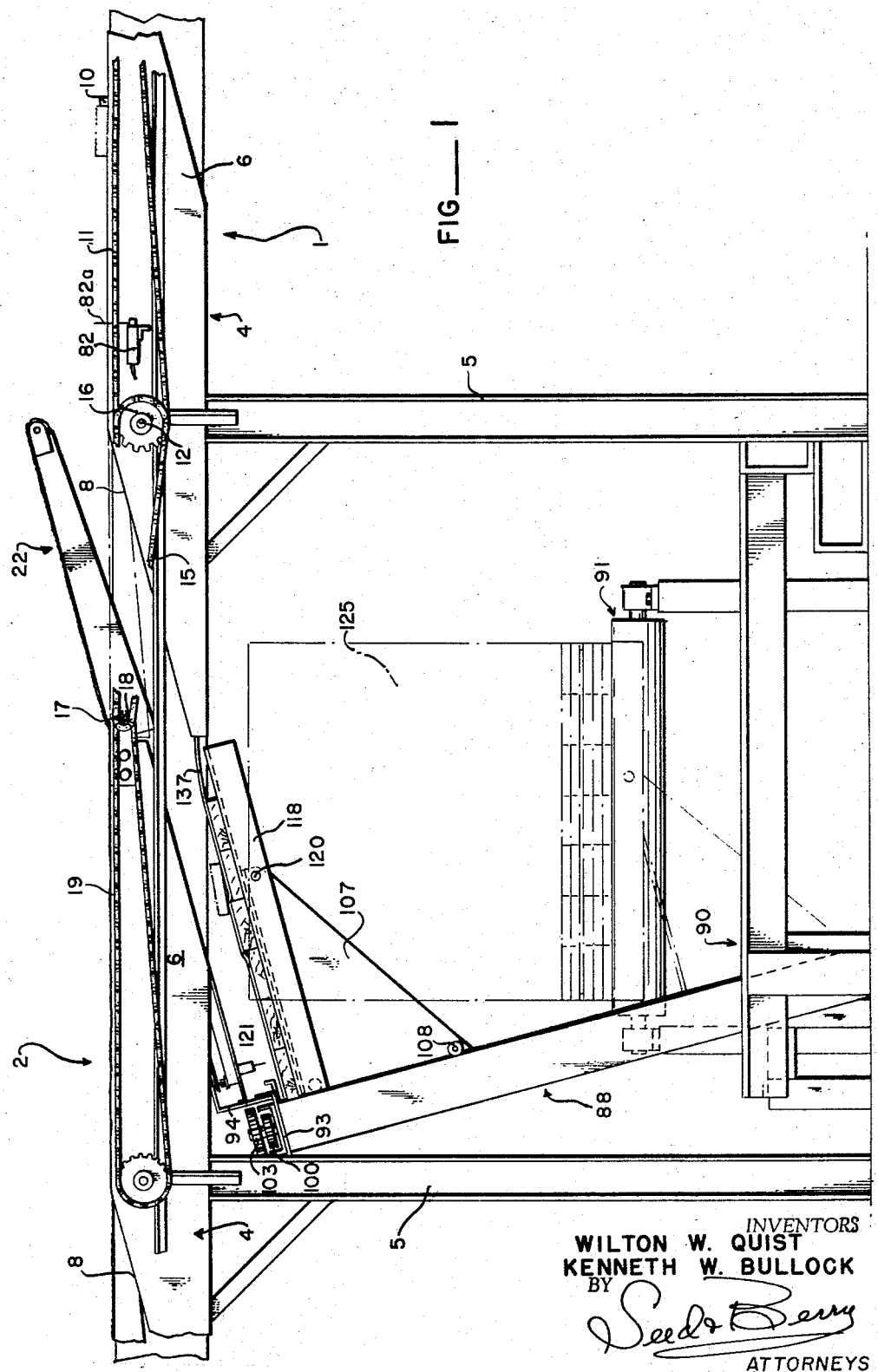

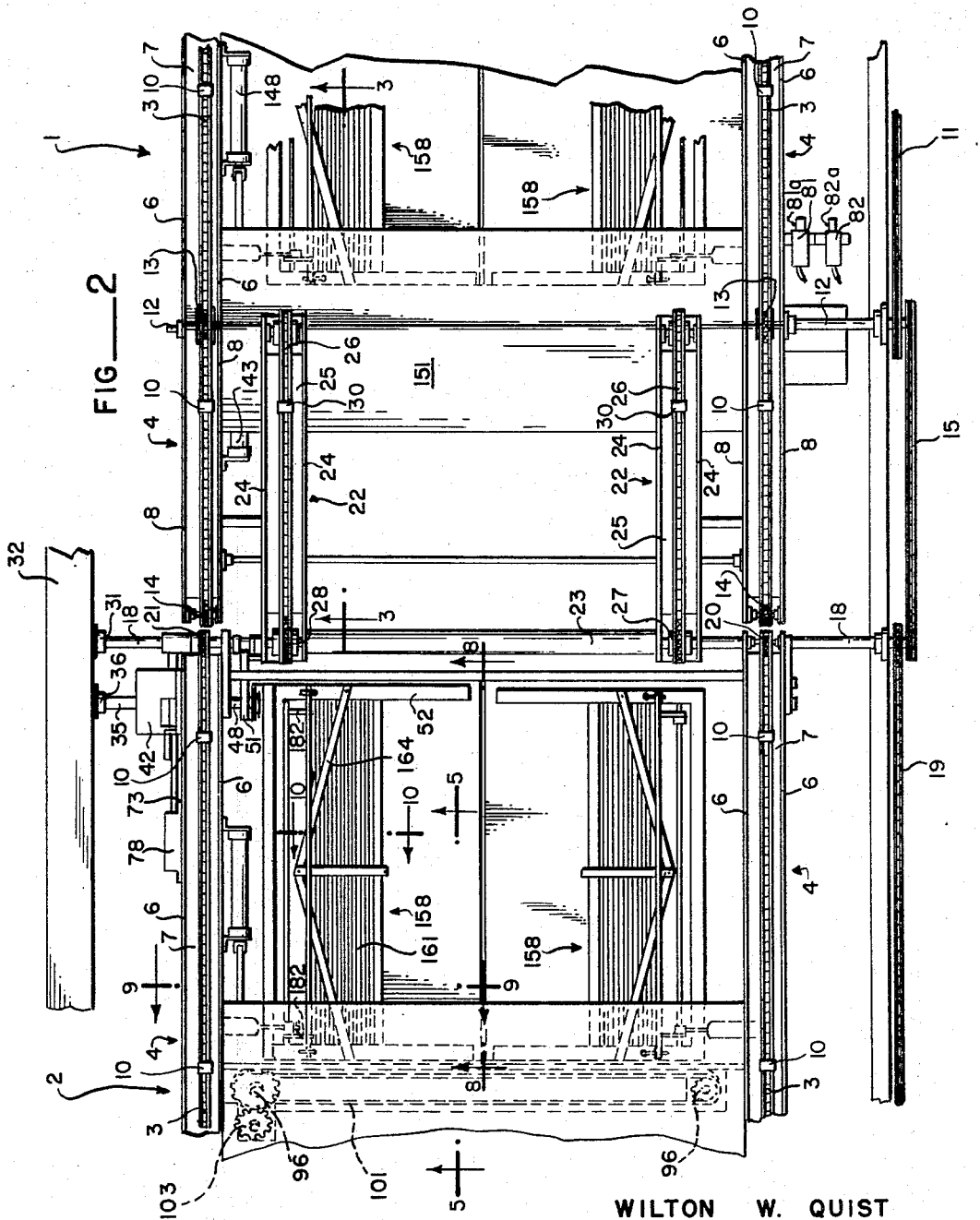

WILTON W. QUIST
KENNETH W. BULLOCK
INVENTORS

BY *Seed & Berry*

ATTORNEYS

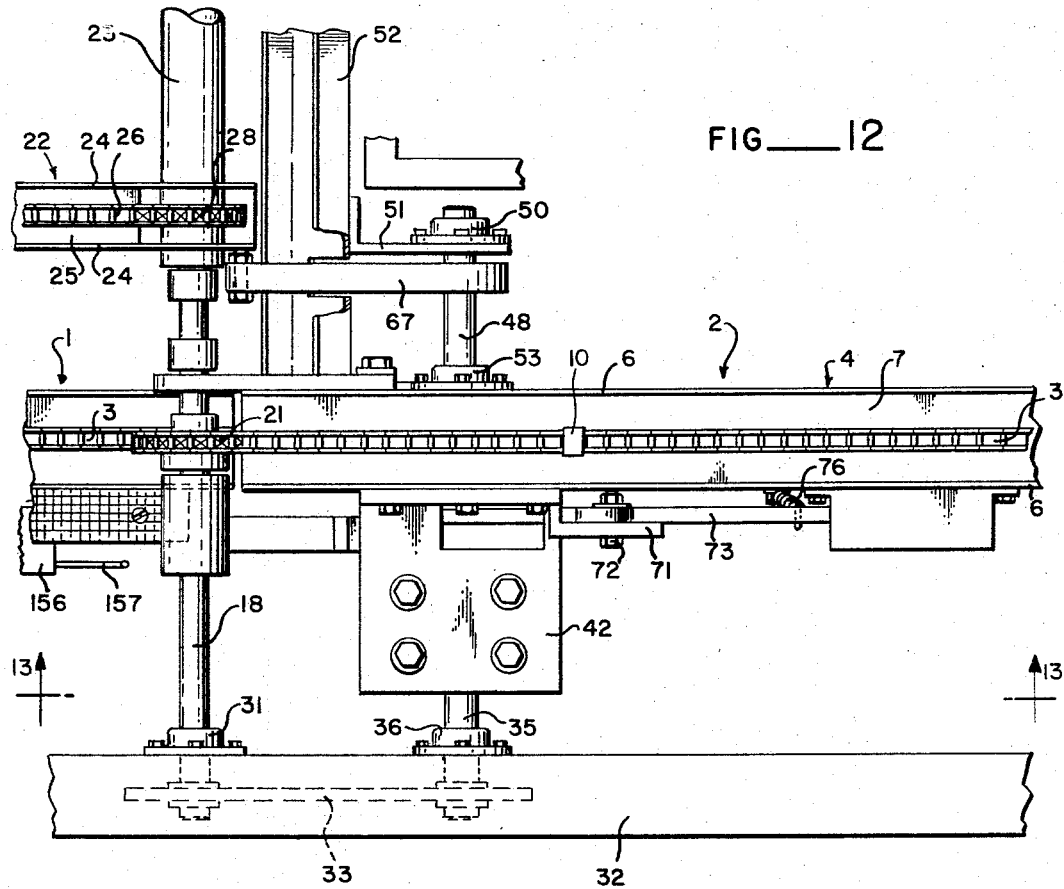
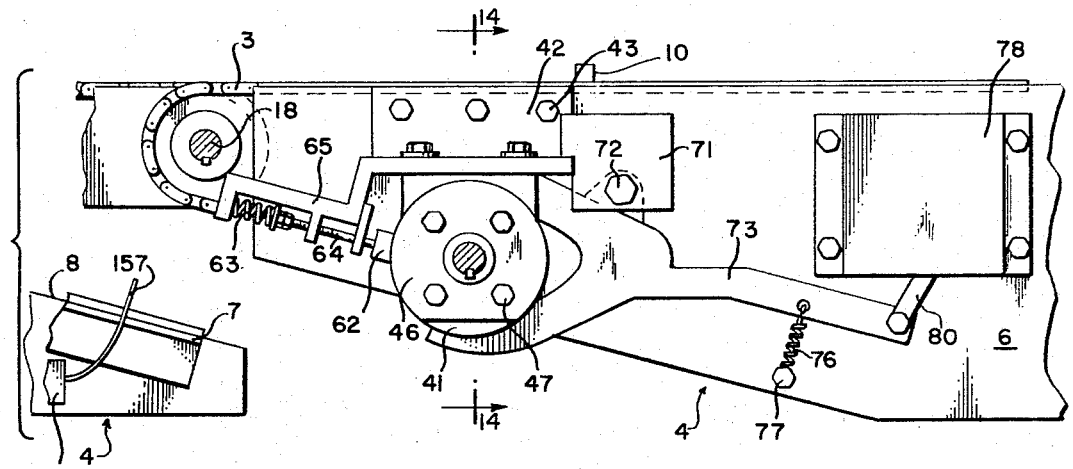
Dec. 20, 1966     W. W. QUIST ETAL     3,292,783
LUMBER SORTER AND STACKER APPARATUS
Filed Jan. 28, 1964     10 Sheets-Sheet 6
FIG__12
FIG__13
WILTON W. QUIST
KENNETH W. BULLOCK
INVENTORS
BY Seed & Berry
ATTORNEYS Dec. 20, 1966   W. W. QUIST ET AL   3,292,783
LUMBER SORTER AND STACKER APPARATUS
Filed Jan. 28, 1964   10 Sheets-Sheet 7
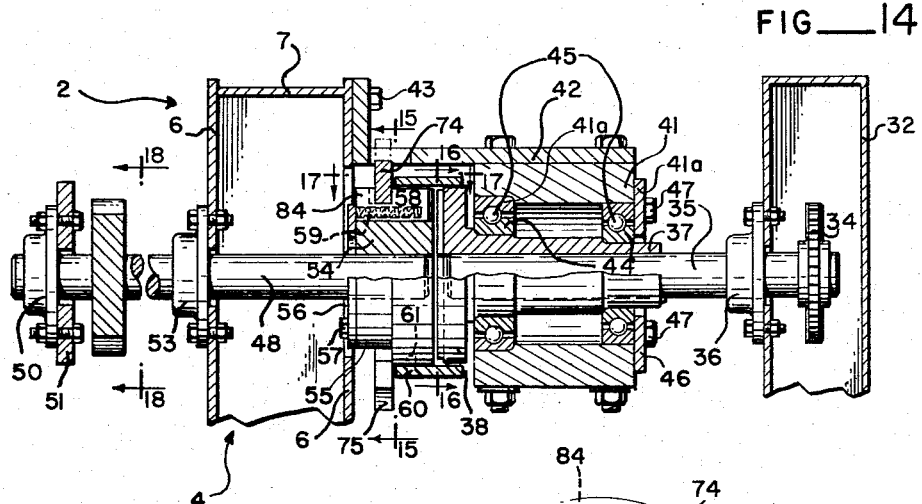
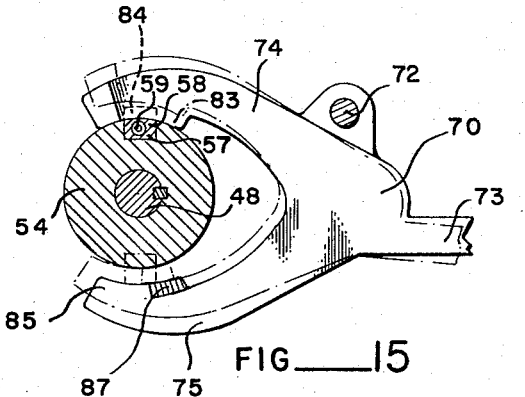
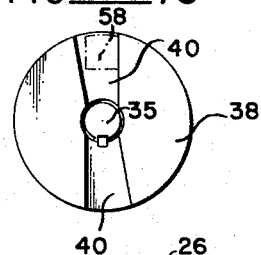
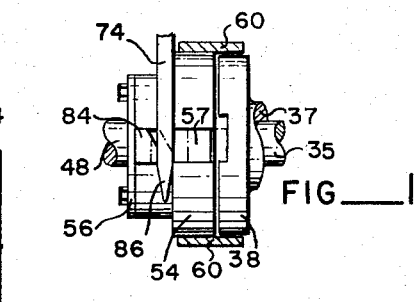
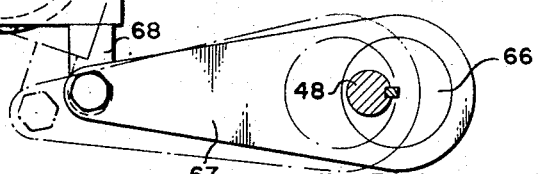
WILTON W. QUIST
KENNETH W. BULLOCK
INVENTORS
BY *Seed & Berry*
ATTORNEYS

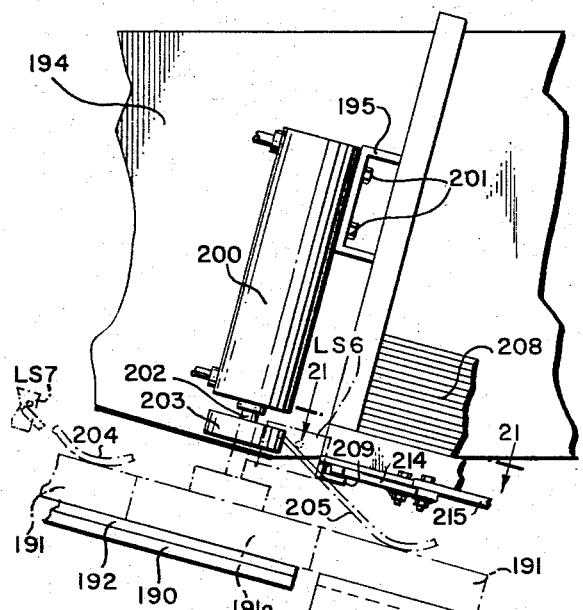
FIG__19
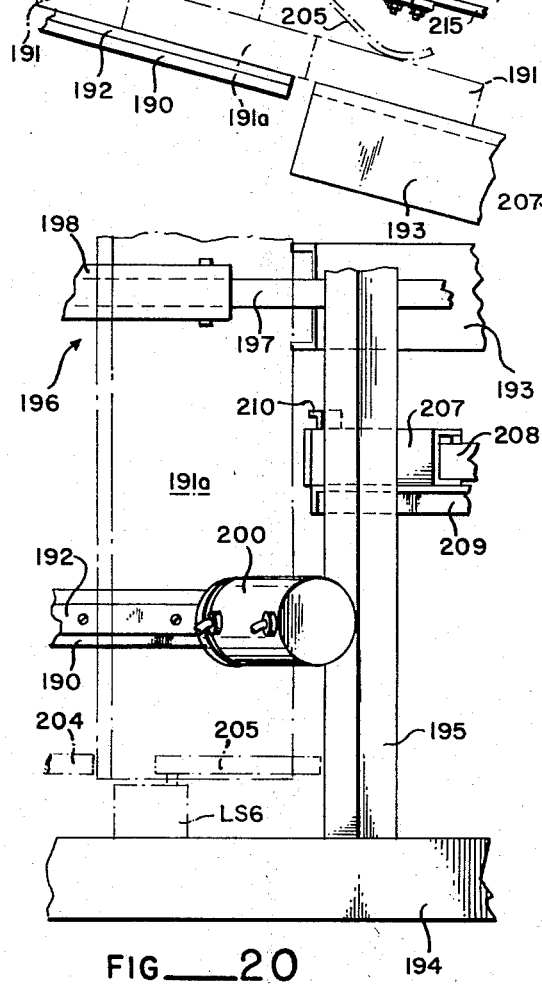
FIG__20
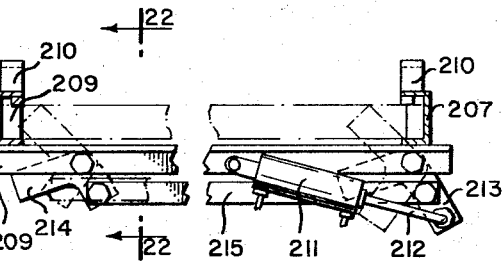
FIG__21
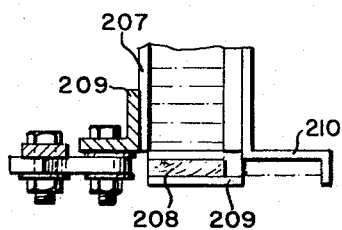
FIG__22
WILTON W. QUIST
KENNETH W. BULLOCK
INVENTORS

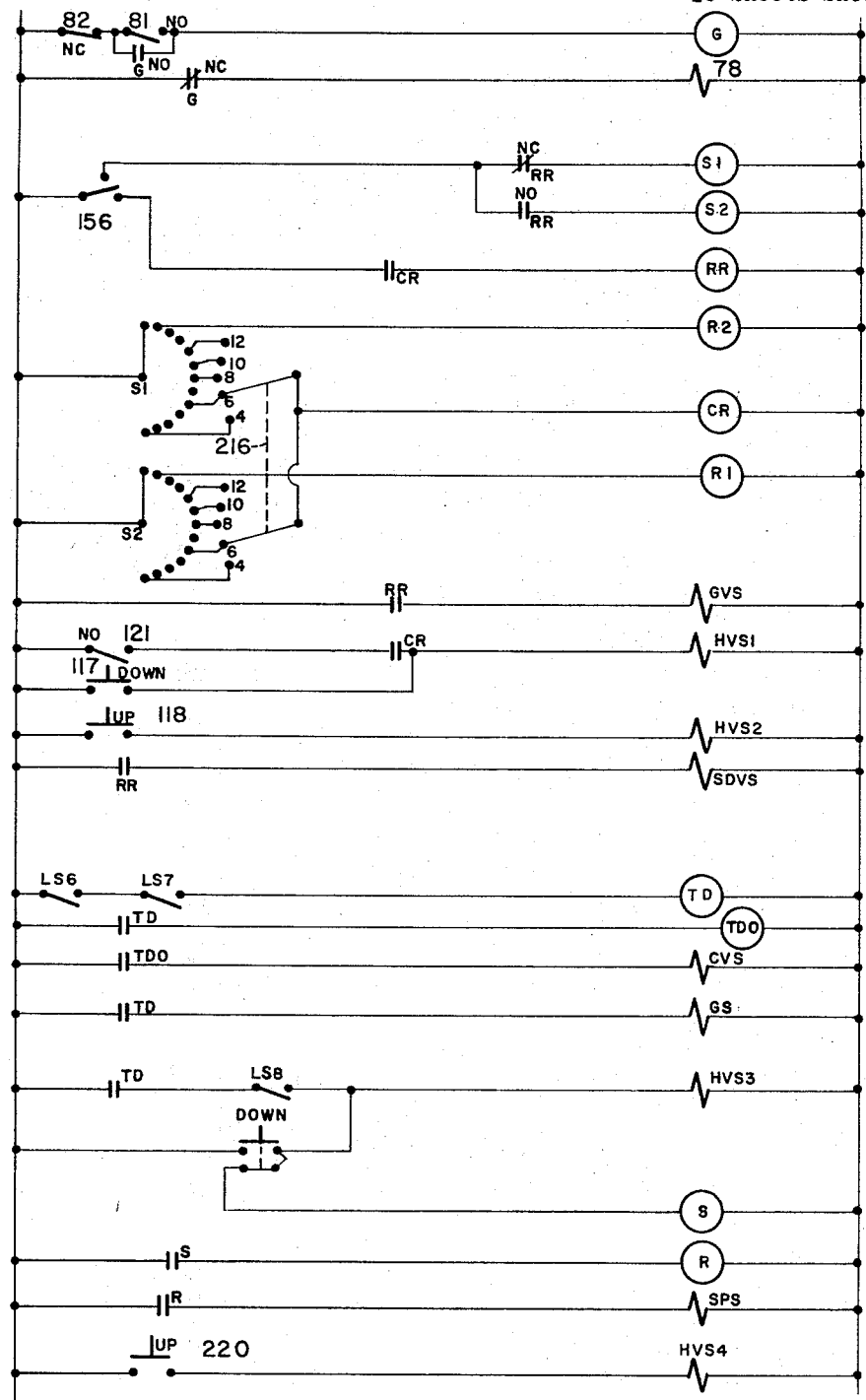
FIG—23

Dec. 20, 1966  W. W. QUIST ETAL  3,292,783
LUMBER SORTER AND STACKER APPARATUS
Filed Jan. 28, 1964  10 Sheets-Sheet 10
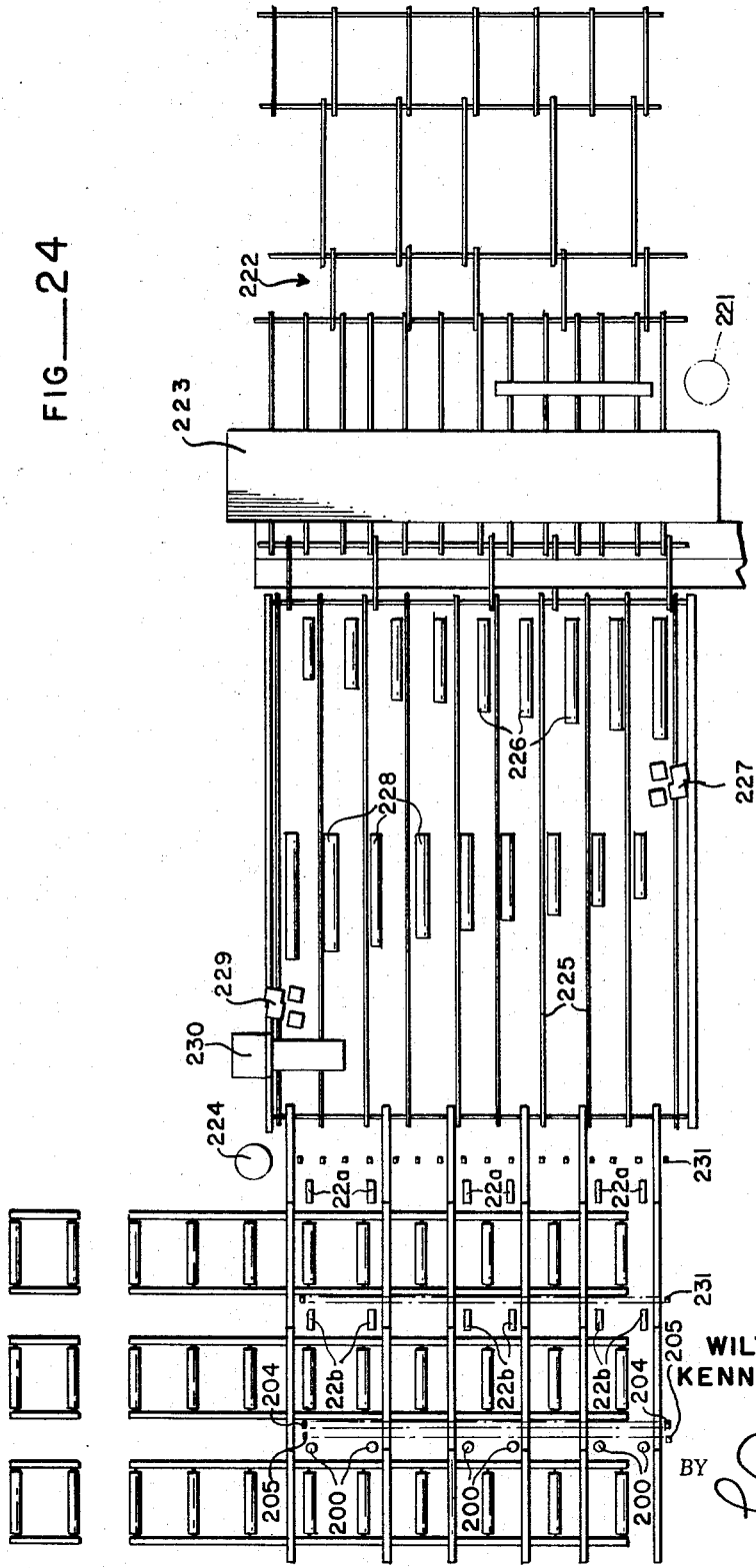
FIG_24
WILTON W. QUIST
KENNETH W. BULLOCK
INVENTORS
BY *Sean Berry*
ATTORNEYS

United States Patent Office 3,292,783
Patented Dec. 20, 1966

3,292,783
LUMBER SORTER AND STACKER APPARATUS
Wilton W. Quist and Kenneth W. Bullock, Seattle, Wash., assignors to Stetson-Ross Machine Company, Inc., Seattle, Wash., a corporation of Washington
Filed Jan. 28, 1964, Ser. No. 340,663
22 Claims. (Cl. 209—90)

The present invention relates in general to an apparatus and system for handling lumber and more specifically to an apparatus and system for performing the functions of conveying, sorting and stacking individual pieces of lumber according to grade, length, thickness or other variables.

Although many devices have been proposed in the prior art for individually performing the functions of either stacking lumber in a prescribed manner or sorting the lumber into different categories, no satisfactory apparatus has yet been developed for sorting lumber into various categories and simultaneously stacking the sorted lumber into neat even stacks ready for subsequent handling or shipment, in a continuous system. The prior art devices normally include means for conveying pieces of lumber, separating the pieces according to grade, size or other criteria and depositing the same onto a pile or loose stack, thus necessitating further handling.

Since the boards, although separated as to length or grade, may be extremely rough or of varying thicknesses, one of the problems normally encountered is that of providing a suitable stacking means for handling each individual piece of lumber. The problem is usually compounded by the fact that the conveying and sorting functions may be done at a fairly even and rapid rate leaving very little time for forming a neat stack. According to the present invention, means are provided for quickly and efficiently stacking the sorted pieces of lumber regardless of their thickness or roughness in such a manner that an even, finished stack may be formed as quickly as the lumber can be conveyed and sorted. In addition, the present invention provides for the placement of spacers or tie members at selected positions within the stack as it is formed in such a manner that the finished stack is ready for banding and shipment or storage as desired.

Another disadvantage in the prior art is that the operation of a gate or other diverting means in the lumber conveyor is not tied in with a definite relationship to the speed of the conveyor. The speed at which the lumber may be conveyed and sorted is therefore usually controlled by the time lapse necessary for operation of a gate or other diverting means. According to the present invention, a gate within the lumber conveyor is controlled directly by the drive means of the main conveyor which allows the conveyor to be run at any speed for adequately handling the lumber involved. According to the present invention, a gate within a continuous conveyor is operated at the same speed as the conveyor and special glide members are alternately placed and removed from between each layer of lumber on a stack, in timed relationship with the operation of the conveyor and the gate means. In addition, tie strips or spacers are deposited between selected layers of the finished stack without interruption of the conveying, sorting and stacking functions.

The primary object of the present invention is, therefore, to provide an apparatus and continuous system for accomplishing the combined functions of conveying, sorting and stacking individual pieces of lumber.

Another object of the present invention is to provide a conveyor system with an integral gate or diverter which will allow the lumber to either continue along the conveyor or to be diverted and formed into a stack according to a predetermined selection.

Another object of the present invention is to provide a gate or diverter operating mechanism which is directly controlled by the drive means for the primary conveyor of the system.

Another object of the present invention is to provide a novel receiving and supporting mechanism for forming a stack of lumber with provisions to automatically adjust the position of the stack as the stack builds and to allow for removal of the finished stack from the system.

A further object of the present invention is to provide means for forming a stack from pieces of rough or uneven lumber by the use of retractable glide members applied between each layer of the stack as it is formed.

A still further object of the present invention is to provide a stack forming apparatus with a novel means for locating tie strips or spacer members at selected positions within the stack as it is formed, without interruption of the sorting and stacking functions.

The means by which the foregoing objects and other advantages are accomplished are set forth in the following specification and illustrated in the accompanying drawings, in which:

FIG. 1 is a side elevation of a single stacking and sorting station of a conveyor system;

FIG. 2 is a plan view of the stacking and sorting device shown in FIG. 1;

FIG. 3 is a cross sectional view of the glide strap moving mechanism taken along lines 3—3 of FIG. 2;

FIG. 4 is a plan view in detail of the mechanism shown in FIG. 3;

FIG. 5 is a vertical cross sectional view taken along lines 5—5 of FIG. 2 and illustrating details of the stack receiving and supporting mechanism;

FIG. 6 is a cross sectional view taken along lines 6—6 of FIG. 5;

FIG. 7 is a cross sectional view taken along lines 7—7 of FIG. 5;

FIG. 12 is a fragmentary detail plan view of the gate actuating mechanism;

FIG. 13 is a cross sectional view taken along lines 13—13 of FIG. 12;

FIG. 14 is a transverse cross sectional view taken along lines 14—14 of FIG. 13;

FIG. 15 is a cross sectional view taken along lines 15—15 of FIG. 14.

FIG. 16 is a cross sectional view taken along lines 16—16 of FIG. 14;

FIG. 17 is a cross sectional view taken along lines 17—17 of FIG. 14;

FIG. 18 is a cross sectional view taken along lines 18—18 of FIG. 14;

FIG. 19 is a partial elevational view of a second embodiment of the stacker mechanism;

FIG. 20 is a fragmentary plan view of the device shown in FIG. 19;

FIG. 21 is a cross sectional view taken along lines 21—21 of FIG. 19 and showing a second embodiment of the slat or spacer dispensing mechanism;

FIG. 22 is a cross sectional view taken along lines 22—22 of FIG. 21;

FIG. 23 is a schematic of a functional electrical control system for the stacker sorter apparatus; and FIG. 24 is a plan view of an overall system incorporating the sorter and stacker apparatus of the present invention.

Figure 8:
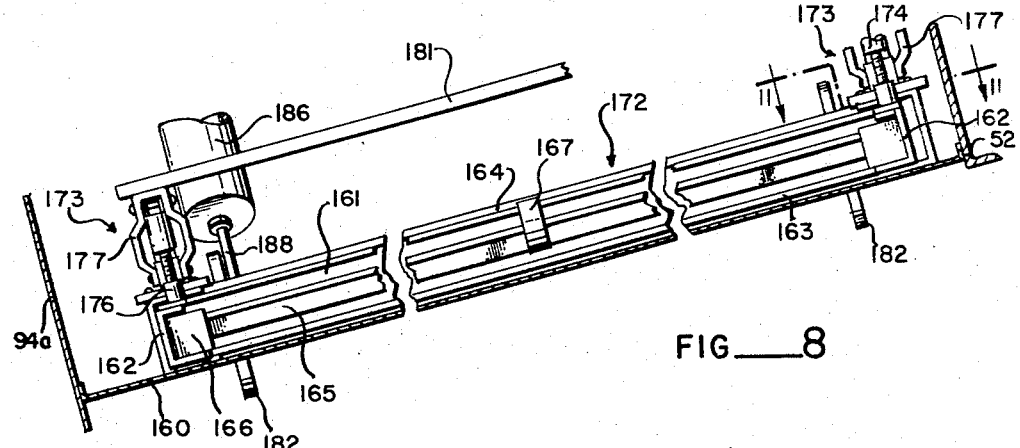
FIG. 8 is a transverse cross sectional view taken along lines 8—8 of FIG. 2 illustrating details of the spacer or tie strip dispensing mechanism.

Referring now to the drawings, wherein like reference numerals are used to indicate identical parts in the various views, the details of the preferred embodiment of the present invention are shown in FIGS. 1 through 18. Before describing the details of a single embodiment of the invention, it will be understood that the individual components of a single unit including; a gate or diverter means, stack receiving and supporting means, lumber glide apparatus and slat dispensing apparatus in the structural relationship shown, may be repeated in series along a single conveyor setup comprising an overall system for separating and stacking lumber into multiple stacks according to grade and size or other criteria.

As shown in FIGS. 1 and 2, the conveyor system is composed of serially arranged identical conveyor sections with a break between each section in a manner which will be obvious from the following description. For the purpose of clarity, the terminal end of a first main conveyor section 1 and the prime or leading end of a second conveyor section 2 have been illustrated in FIGS. 1 and 2. Each conveyor section includes identical parallel conveyor chains 3, which move along the guide members indicated generally at 4. Although chains are shown and described specifically, it will be understood by those skilled in the art that other equivalent endless conveyor means can be used. As shown in FIG. 1, the chain guide members and the entire conveyor system may be supported by suitable uprights 5 in any conventional manner. The chain guide members may be in the form of elongated box-like structures which include vertical side plates 6 and horizontal plates 7 welded or otherwise connected between the side plates and recessed from the top edges thereof to form a channel within which the chains 3 move.

As shown most clearly in FIGS. 2, 3 and 4, the vertical side plates 6, at the terminal end of each conveyor section, are formed to provide inclined surfaces 8 and the horizontal plates 7 are likewise inclined at the terminal ends of the conveyor sections to provide inclined surfaces for the chains 3. For the purpose of conveying individual boards along the chain guide members 4, each chain 3 is equipped with spaced lugs 10 which are in alinement transversely of the conveyor. During the sorting and stacking operation, the chain members 3 are driven in unison at a constant even rate by any suitable power source. Since the conveyor section 1 shown in FIG. 2 is the first of a series of conveyor sections, a drive chain 11 is connected to the power source and serves to rotate the conveyor drive shaft 12 which extends transversely of the conveyor section and is suitably journaled in the chain guide members 4. The chains 3 of the conveyor section 1 may be driven directly by sprockets 13 and may be trained about idler sprockets 14 journaled at the extreme ends of the inclined edges of the side plates 6 as shown in detail in FIG. 4. The chain members of the succeeding conveyor section 2 are driven by means of a second drive chain 15 which passes about a suitable sprocket 16 on the shaft 12 and a sprocket 17 on a second conveyor drive shaft 18 journaled in the chain guide members 4 of the second conveyor section 2. The drive shaft 18 provides a mounting for idler sprockets 20 and 21 for mounting the chains of the second conveyor section. A third drive chain 19 may be uned to transfer the drive from shaft 18 to succeeding conveyor sections of the system.

Gate arms

The diverter means or means by which individual pieces of lumber are caused to exit from the conveyor system and to follow the downwardly inclined surfaces 8 of the chain guide followers 4, constitutes a specially constructed gate apparatus and synchronized operating mechanism now to be described. The gate or diverter comprises two identical longitudinally extending gate arms 22 which, as seen in FIGS. 2 and 12, are fixed at one end to a hollow shaft 23 which surrounds the conveyor drive shaft 18 and is mounted for relative rotation therewith. As seen in the drawings, the gate arms 22 are parallel with each other and with the chain guide members 4 of the conveyor sections and extend away from the hollow shaft 23 in a direction opposite to the movement of the conveyor chains 3. The gate arms 22 are similar in construction to the chain guide members 4 and include vertical side plates 24 between which are connected, by welding or the like, horizontal chain guide plates 25. The guide plates 25 are recessed slightly from the top edges of the vertical plates 24 so as to provide a channel for the operation of identical conveyor chain sections 26 or similar endless conveyor means which move in the same direction as the conveyor chains 3 and are driven by sprockets 27 and 28 keyed to the conveyor drive shaft 18. Since the shaft 18 is driven continuously with the operation of the conveyor system, the conveyor chain sections 26 move in the same direction and at the same rate of speed as the conveyor chains 3. The conveyor chain sections 26 will also be provided with lugs 30 which are so spaced as to be in position to contact a board moved by the conveyor chains 3 of the first conveyor section 1 and to continue its movement to a point where the conveyor chains of the second conveyor section 2 will pick the board up and move it further along the conveyor. In this manner, when the gate arms 22 are in a horizontal or closed position as shown in FIG. 2, the gate serves to bridge the gap between the inclined terminal ends 8 of the first conveyor section 1 and the second conveyor section 2. Thus, if any given board is not of the particular selection desired to be separated by the particular gate shown in FIG. 2, the board merely continues to travel past the break between the sections 1 and 2 of the conveyor.

The control means for opening and closing the gate arms 22 is shown in detail in FIGS. 12 and 18. The conveyor shaft 18, which extends laterally beyond the chain guide members 4, has its end portion journaled in a suitable bearing 31 secured to a protective housing 32 which runs parallel with the conveyor system as shown in FIG. 12. A sprocket on the end of the drive shaft 18 drives a connecting chain 33 which also passes about a sprocket 34 carried by a drive shaft 35 journaled at one end in a bearing 36 also attached to the protective housing 32 as shown in detail in FIG. 14. The driven shaft 35 has keyed thereto a bearing sleeve 37 which terminates in a circular plate 38 as shown in detail in FIG. 14. The face of the plate 38, which is adjacent the chain guide member 4, is provided with diametrically opposed slots 40 for a purpose presently to be described. The bearing sleeves 37 and the end of the shaft 35 are supported for rotation in a housing ring 41 affixed to an angle bracket 42 which may be secured to the chain guide member 4 by means of bolts 43. The ring 41 is provided with spaced ball races 41a and the sleeve 37 is provided with a complementary set of spaced ball races 44, with ball bearing members 45 providing a frictionless bearing for the rotation of the shaft 35 and sleeve 37 within the ring 41. The ball races 41a and 44 may be press fitted to their respective carriers and in retaining plate 46 may be additionally secured to the ring member 41 by means of bolts 47.

A gate operating shaft 48 is carried at one end by a bearing member 50 secured to a bracket 51 which may be attached by welding or the like to a transverse frame member 52 extending between the chain guide members 4 as shown in FIG. 12. The gate operating shaft 48 passes through the body of the chain guide member 4, as shown in FIG. 14, and is also supported for rotation by means of a second bearing member 53 which is bolted or otherwise affixed to the inside vertical plate 6 of the guide channel 4. The outer end of the gate operating shaft 48 is keyed to a circular ring 54 which includes a reduced diameter portion 55, the inside face of which carries a stop plate 56 secured thereto by means of bolts 57 for a purpose to be described. The ring 54 is also provided with a single longitudinal slot 57 which extends the full width of the ring on the outside surface thereof including a portion of the surface of the reduced diameter portion 55. A slidable rectangular key 58 is contained within the slot 57 and biased to move in the right hand direction as viewed in FIG. 14, by means of a compression spring 59 which seats at one end against the retaining plate 56 and extends into a suitable bore within the key member 58. To complete the structure of the ring 54, a circular friction brake band 60 is affixed to the outside surface of the ring by means of suitable cap screws 61 and extends laterally adjacent the outside surface of the circular plate 38 without contacting it. The friction band 60 may be formed from any suitable material either metallic or nonmetallic chosen for its frictional characteristics. A brake shoe 62, shown in FIG. 13, is held in constant frictional contact with the brake band 60 by means of compression spring 63 which acts against connecting rod 64 of the brake shoe, with the rod 64 and the spring 63 being supported by a suitable bracket 65 connected to the angle bracket 42. With this structure, it will be understood that the brake shoe 62 maintains a constant drag, by its contact with the brake band 60, for a purpose which will presently be described.

In order to transfer the rotary motion of the shaft 48 to open and close the gate arms 22, an eccentric 66 is keyed to rotate with the shaft 48 and is rotatably connected to a pitman or connecting rod 67 shown in detail in FIG. 18. The pitman 67 is, in turn, pivotally connected to a depending arm 68, welded or otherwise attached to the vertical side plate 24 of one of the gate arms 22. The eccentric 66 and the pitman 67 are so connected to the gate arm as to move the gate arm from a horizontal position to a raised position during one half revolution of the shaft 48 and to return the gate arm from the raised position to a horizontal position during the balance of the revolution of the shaft 48, as illustrated in FIG. 18.

In order to selectively rotate the shaft 48 in increments of one half revolution, the spring pressed key 58 is caused to engage and disengage the slots 40 of the constantly rotating plate 38 by means now to be described. A yoke member 70, shown in FIG. 15, is pivotally connected to a bracket 71 carried by the bracket 42 by means of a pivot pin 72. The yoke 70 includes an operating arm 73 and upper and lower jaw members 74 and 75 respectively, with the jaws 74 and 75 being closely positioned above and below the reduced diameter portion 55 of the ring 54, as shown in FIGS. 14 and 15. The yoke 70 may be rotated about the pivot 72 for contacting either the top surface or bottom surface of the reduced diameter portion 55 with the upper and lower jaws 74 and 75 respectively, as shown by the dotted line portions of FIG. 15. The yoke 70 is biased for rotation clockwise about the pivot 72 by a tension spring 76, connected to the arm 73 and to the side plate 6 of the chain guide member by means of a screw fastener 77. The yoke is rotated in the counter clockwise direction by means of a normally energized solenoid 78 carried by the plate 6 of the chain guide member 4. The solenoid 78 may be of any conventional type and operates the yoke in the counter clockwise direction by means of a connecting link 80 pivotally connected to the end of the arm 73 of the yoke.

The structures thus far described for the control of the operation of the gate arms 22 may be considered as a clutching mechanism or a selective intermittent drive connection, the operation of which is controlled by means of contact switches now to be described. As shown in FIG. 2, a plurality of contact switches, two of which are indicated at 81 and 82 in the drawings, are mounted on one of the chain guide members 4 and include contact rods or arms 81a and 82a respectively. The contact arms 81a and 82a are positioned to be contacted by the end of a board moving along the conveyor section 1. The switch contact members are laterally spaced so as to be contacted by different lengths of boards desired to be diverted and stacked separately. For instance, it may be desired to stack all boards of a first given length at the break in the conveyor and by the gate arms 22 in FIG. 2. In this case, boards of the desired length would contact only the switch arm 81a of the switch 81 which would result in the opening of the gate arms 22 to divert that particular board. All boards passing this point which were longer than desired for stacking at that particular point would contact not only the switch arm 81a but also the switch arm 82a which would result in maintaining the gate arm 22 in the horizontal position so that the board would continue on past the break in the conveyor to be diverted at a different point later on in the conveyor system. The sequence of operations involved in diverting one board will now be described and it will be understood that the yoke member 70 is in the full line position shown in FIG. 15 such that the operating shaft 48 is stationary and the shaft 35 is continuously rotating as previously described. It will also be noted that, in this position, the key 58 being held in the retracted position shown in FIG. 14 such that the operating shaft 48 is stationary and the shaft 35 is continuously rotating as previously described. It will also be noted that, in this position, an offset portion 83 of the upper jaw 74 of the yoke is engaged with an upstanding lug 84 on the key 58 to hold the key retracted and the spring 59 compressed, as long as the yoke remains in the stationary position shown in full lines in FIGS. 14 and 15. It will also be noted that the lower jaw 75 also includes an offset portion 85 for engaging the surface of the reduced diameter portion 55 of the ring 54 and that the extreme end of the offset portion 83 is tapered as at 86 and the inner end of the offset portion 85 is tapered as at 87 to provide a cam surface for engaging and moving the lug 84 of the key 58.

As soon as a moving board contacts the switch operating arm 81a, the solenoid 78 will be deenergized allowing the spring 76 to rotate the yoke 70 in the clockwise direction to move the jaws 74 and 75 to the dotted line position shown in FIG. 15. As soon as the offset portion 83 of the upper jaw of the yoke moves away from the lug 84 of the key 58, the spring 59 causes the key to move to the right as viewed in FIG. 14 and engage one of the slots 40 on the constantly rotating plate 38. The plate 38 will then be locked with the ring 54 causing the shaft 48 to rotate clockwise as viewed in FIG. 15 thus moving the eccentric 66, pitman 67, and gate arms 22 to the dotted line position shown in FIG. 18 to open the gate arms allowing the board to continue down the incline surfaces 8 of the chain guide members to be thus diverted from the conveyor system. The shaft 48 and the ring 54 will only be allowed to rotate one-half of a revolution since the offset portion 85 of the lower jaw 75 of the yoke has now moved to a position such that the taper 87 contacts the lug 84 to again retract the key 58 and discontinue the drive connection between the plate 38 and the ring 54. The purpose of the constant drag provided by the brake shoe 62 and the brake ring 60 on the ring 54 is to smooth out the operation of the gate arms and to prevent jerking of the shaft 48. The gate arms will remain in the open position as long as the boards moved along the conveyor are of such a length as to only contact the switch arm 81a, and the yoke 70 will remain in the dotted line position shown in FIG. 15. As soon as a single board is moved along the conveyor which is of sufficient length to contact both the operating arms 81a and 82a, an appropriate electrical circuit later to be described will again energize the solenoid 78 and condition the switch 81 for another cycle of operation, at the same time causing the gate arms 22 to again close as will now be described. The energization of the solenoid 78 by the longer board rotates the yoke 70 counter clockwise by means of the connecting link 80 and the arm 73 and against the tension of spring 76, to again move the yoke to the full line position shown in FIG. 15. This action removes the offset portion 85 from the path of the lug 84 and the key 58, allowing the key to move to the right as shown in FIG. 14. The key again engages one of the slots 40 on the rotating plate 38 to allow the plate to rotate the ring 54 one-half revolution which returns the gate to the closed or horizontal position shown in full lines in FIG. 18. As the key 58 approaches the top jaw 74 of the yoke, the tapered end 86 of the jaw serves to contact the lug 84 of the key and retract the key to disengage it from the rotating plates 38 and thus halt the movement of the gate arms. The gate arms will then remain in the closed position until the cycle just described is again repeated by the presence of a shorter length board moving along the conveyor. In this manner, the diverter means or gate means may be conditioned to divert only a given length of boards and to allow all boards of a greater length to pass on by the diverter means depending upon the positioning of the two switches 81 and 82.

*Stack receiving and supporting means*

Turning now to the automatic stacking mechanism of the present invention, attention is directed to FIGS. 1 and 5 through 7. The lumber receiving and supporting apparatus comprises upright inclined laterally spaced frame members indicated generally at 88, one of which is shown in FIG. 1 and the other in FIG. 5. The frame members may be rectangular in cross section and identical in structure with one such frame member 88 being located on each side of the conveyor adjacent the chain guide members 4. The frame members 88 are rigidly attached by any suitable means at their bottom ends to the frame structure 90 which forms a portion of the overall stationary frame structure of the conveyor system. As indicated in FIG. 1, the frame members 88 extend from a roller conveyor 91 upwardly to a position adjacent the bottom of the conveyor section 2. The top ends of the rectangular frames 88 may be interconnected by means of an angle iron 92 shown in FIG. 5 which also supports an inverted U-shaped channel member 93 at its upper end. The screw members 96 are provided with sprockets 98 and 100 as shown in FIGS. 1 and 5 with suitable driving chain 101 connected therebetween for rotating the screw members in unison. As shown in FIG. 5, a drive gear 102 is keyed to the screw shaft 96 above the sprocket 98 and meshes with gear 103 driven by any conventional reversible motor 104 which may be a fluid motor fitted with fluid conduits 105 and 106. The fluid motor 104 may comprise any suitable reversible fluid motor the operation of which will be explained later on in the specification.

Mounted on the face of each of the rectangular frame members 88 adjacent the conveyor 91 is a triangular brace plate 107 provided with a first set of bottom rollers 108 which bear against the face of the frame member and a guide projection 110 which engages in the slot 95 to guide the vertical movement of the plate 107. A second set of top roller members 111 is carried by the upper end of the plate 107 on the outside surface of the frame members 88 and cooperates with a third set of rollers 112 on the inside of the rectangular frame members to guide the plates 107 for vertical movement along the face of the frames. The rollers 112, as seen in FIGS. 5 and 6, are carried on parallel guide brackets 113 which are fixed to the plate 107 and extend through the slot 95 to be welded or otherwise affixed to a flat collar 114 having a slotted opening 115 which surrounds the screw member 96. The collar member 114 rides on the top of a screw threaded collar 116 which is provided with upstanding lugs 117 for engaging the sides of the member 114 to prevent relative rotation between the screw threaded collar 116 and the screw shaft 96. Thus, when the screw shaft 96 is rotated in either direction, the collar 116 is caused to move up or down within the housing 88 to raise or lower the plate 107. An inverted U-shape channel 118 rests on top of each of the plates 107 and is pivotally connected to the plate by a pivot pin 120 with the two laterally spaced channels 118 being designed to receive and support the lumber as it is diverted from the conveyor section. As seen in FIG. 1, this is accomplished by locating the channel members 118 at the end of the incline surfaces 8 of the guide channels 4 of the conveyor sections.

The lowering of the plates 107 and guide channels 118 as a stack of lumber is built up, is controlled by a contact switch 121, the signal of which controls the actuation of the reversible motor 104 which will be later described. Each time the first board of a layer is deposited and slides down the channel members 118, it contacts the switch arm of the switch 21 thus causing the motor 104 to be actuated for lowering the plate 107 and arms 118 and increment equal to the thickness of the boards being stacked. The first board of each succeeding layer which contacts the switch 121 causes further incremental lowering of the lumber supports. To complete the structure of the lumber receiving and supporting means, a spring band 122, the coil of which is carried in a suitable bracket 123. is attached at its free end to the members 113 by means of a rivet or other attaching device 124. It will be understood that each of the channel members 118 is provided with a band 122, such that the band provides a movable surface against which the edges of the boards rests as the stack is progressively lowered. When a sufficient stack 125, shown in FIG. 1, is built up, with the lowering of the plates 107 to the dotted line position shown in FIG. 1, the contact between the horizontal rolls of the conveyor 91 and the bottom of the stack 125 causes the channels 118 to pivot to the horizontal position shown in FIG. 1, thus depositing the formed stack onto the conveyor 91 ready for removal.

*Glide strap mechanism*

In order that the individual boards carried down the incline surfaces 8 by the conveyor chains 3 may slide freely over the surfaces of the boards of previously formed layers on the channels 118, the present invention provides a unique glide strap mechanism illustrated in detail in FIGS. 3 and 4. Although the details of only one such glide strap mechanism is shown in FIGS. 3 and 4, it will be understood that each side of the conveyor is equipped with one of the glide strap arrangements shown, located directly in line with each channel 118 of the stack receiving arrangement described.

As shown in FIGS. 3 and 4, each glide strap mechanism comprises tubular guides 126 and 127 carried by the braces 128, extending inwardly from the inside vertical plates 6 of the chain guide members 4. It will also be noted that the tubular guides 126 and 127 are inclined to the horizontal at an angle slightly less than the angle of the incline surfaces 8 of the chain guide members 4. A first chain member 130 passes through the tubular guide 126 and about a drive sprocket 131 and a suitable idler sprocket, not shown, mounted on a transverse shaft 132 at the other end. The shaft 132 extends between and is supported for rotation by the chain guide members 4, and the sprocket 131 is keyed to a rotatable shaft 133 which likewise extends between and is rotatably supported by the chain guide members. A second chain member 134 is driven by a sprocket 135 keyed to the transverse shaft 136 and passes through the tubular guide 127 and about an idler sprocket, not shown, on the transverse shaft 132. A first flexible glide strap 137 is riveted or otherwise anchored to the chain 130 and a second flexible glide strap 138 is likewise connected to move with the chain 134. As shown in FIG. 4, the straps 137 and 138, on both sides of the conveyor sections are in longitudinal alignment with the channel members 118 of the stacker unit and may be extended or retracted by means to be described to provide a sliding surface for the individual boards reaching the end of the inclined surfaces 8 of the chain drive members 4. The straps 137 and 138 are preferably formed of nylon or any other equivalent material which exhibits a low coefficient of friction and a high degree of tensil strength and flexibility. In order to provide an extremely slick or smooth surface on the glide straps, they may be coated with a material such as Teflon which is well known in the art.

The two glide straps 137 and 138 are designed to be extended alternately as the layers of the stack 125 are built up in the following manner. The sprocket 131 for driving the chain 130 and the strap 137 is moved by means of a rack 139, the teeth of which mesh with a pinion 141 keyed to the transverse shaft 133. The rack 140 is connected to the piston rod 142 of a double-acting fluid cylinder 143 fixed to the vertical side plates 6 of the chain guide member. As shown in FIGS. 3 and 4, the piston rod 142 is in its extended position and has rotated the sprocket 131 in the counter clockwise direction to extend the strap 137 on to the surface of the channel member 118 of the receiving and stacking unit. In order to guide the rack 140 for reciprocation, two roller guide members 144 are located therebeneath and affixed to the plate 6. The sprocket 135, which moves the chain 134 and strap 138, is similarly rotated by the means of a rack 145 the teeth of which mesh with the teeth of a pinion 146 keyed to the transverse shaft 136. The rack 145 is reciprocated by means of the piston rod 147 of the double acting fluid motor 148 and is guided in its motion by means of the roller guides 150 located thereabove and attached to the vertical side plate 6. As seen in FIGS. 3 and 4, the piston rod 147 and rack 145 are retracted and have rotated the sprocket 135 clockwise to thus retract the like strap 138 from the surface of the member 118. The positions of the straps 137 and 138 may be reversed by retracting the piston rod 142 and extending the piston rod 147. Thus, one of the straps 137 or 138 on each side of the conveyor section is always extended and one strap on each side of the conveyor sections is always retracted.

A sheet metal cover 151 extends between the chain guide members 4 and overlies the major portion of the glide strap operating mechanism described. The cover member 151 may include a vertical wall 152 extending in back of the sprockets 131 and 135 and connected to the inclined cover member 94 and downwardly extending panel 94a secured to the U-shaped channel 93 to further enclose the moving parts of the glide strap control mechanism.

The concurrent operation of the fluid cylinders 143 and 148 and the function of the glide straps on both sides of the conveyor section will now be described. The incline of the surfaces 8, down which the boards are moved by the conveyor chains, and the incline of the U-shaped channel members 118 of the stack forming apparatus is somewhere in the neighborhood of approximately 19° to the horizontal such as to cause the boards to slide along the members 118 when they are released from the end of the conveyor to form a layer as shown in FIG. 1. Since the boards being handled may often be rough and slightly varying in thickness, means must be provided to insure that the boards will slide all of the way down the layer and not be caught by the roughness of the preceding layer. As previously mentioned, one of the sets of straps 137 or 138 is always in the extended position and, as shown in FIG. 4, the strap 137 is in the extended position on the top surface of the members 118 at the beginning of a stacking operation. As the boards issue from the end of the incline surfaces 8, they slide easily over the surfaces of the straps 137 and form the first layer, as shown in FIG. 1, on top of the straps 137 and close the switch 121 to condition the stack supporting apparatus for lowering at the completion of a layer.

A counter or stepper actuator, which will be referred to as a counter or stepper switch 156, is mounted on the extreme end of one of the chain guide members 4 as shown in FIG. 13 and has a contact arm 157 which extends upwardly and is contacted by each board which issues from the end of the conveyor section. The width of the boards being sorted and stacked will be substantially uniform such that a constant given number of boards will constitute a single layer of the stack 125. A counter or stepper device later to be described and which is actuated by stepper switch 156 may be set for a count corresponding with the number of boards in a single layer and conditioned to provide a signal for operating the appropriate solenoid valve later to be described for controlling the operation of the fluid motors 143 and 148. When the requisite number of boards forming a layer of the stack have passed the stepper switch 156, the rod 142 of the fluid cylinder 143 will be retracted to operate the chains 130 to pull both of the extended straps 137 to the retracted position and simultaneously the rod 147 of the fluid motor 148 will be extended to move the chain 134 to extend the two retracted straps 138 on to the top of the completed layer of boards. The completion of the count of the stepper switch will also cause the lowering of the stack through the closed switch 121 in a manner later to be described. This condition is shown in FIG. 1. It will be noted that since the guide channels 126 and 127 are disposed at a slightly smaller angle than the angle of incline of the end of the conveyor, the straps are free to extend and drop to the surface of the layer of boards. As soon as the next board destined for the stack being formed issues from the end of the conveyor section, it again closes the switch 121 to again condition the stack supporting device for lowering at the completion of the layer of boards. This cycle of retraction and extension of the glide straps is repeated as the stack 125 is built up.

*Slat dispensing*

In order that the stack 125 may be made rigid as it is built up, provision is made in the present invention for depositing tie strips or cross slats between preselected alternate layers of the stack as it is built. The slats are in the form of narrow strips such as lath or the like and provide rigidity to the stack so that it may be banded and handled without buckling. To this end, a novel dispensing unit is provided and is shown in detail in FIGS. 8 through 11 of the drawings.

In order that slats may be deposited on each end of the stack being formed, a slat dispensing or dropping unit 158 is located on each side of the conveyor section 2 with the general positioning of the dropping unit being indicated in FIG. 2. It will be understood, of course, that other units could be provided to dispense tie members intermediate those shown. In this position, the slat dropping units 158 are directly above the stack 125 being formed. Although the details of only one of the slat dropping units is shown in FIGS. 8 through 11, it will be understood that the structure and operation of the two slat dropping units shown are identical.

Figure 10:
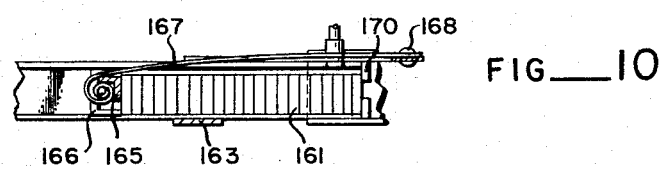
FIG. 10 is a cross sectional view taken along lines 10—10 of FIG. 2.

Referring to FIG. 8, the slat dropping unit 158 may be supported by means of a transversely extending support plate 160 welded or otherwise supported between the transverse frame member 52 and the panel 94a as shown. In the preferred embodiment, a plurality of slats or laths 161 are slidably held between two parallel channels 162 which are held in spaced relation by means of cross braces 163 along their bottom sides and a V-shaped cross brace 164 on their top side to form a cartridge for holding and dispensing the slats. The slats 161 are backed up by a slidable follower 165 which has enlarged end portions 166 for guiding the follower within the channels 162. The slats are biased in the right hand direction as seen in FIG. 10 by means of a coiled leaf spring 167 which bears against the follower 165 at one end as riveted or otherwise fixed to the top cross member 164 by a rivet or screw 168. The slats 161 are prevented from being pushed out of the ends of the channels 162 by means of the stop members 170 but are permitted to be slid downwardly from between the end of the channels 162 by virtue of openings 171, shown in FIG. 11, in the bottom legs of the channels 162.

In order that the cartridge formed by the channels 162 and cross members 163 and 164 may be removed and refilled with slats, the entire structure is removably clamped to a channel iron frame indicated generally at 172. The frame 172 is generally U-shaped and includes clamping elements 173 at its opposite ends for clamping the removable cartridge to the frame. As seen most clearly in FIGS. 9 and 11, the closed ends of the channels 162 are received by the channel iron frame 172 and are releasably held by the clamps 173.

Although it will be understood that various clamping devices may be utilized in conjunction with the present invention, each clamp 173 includes an arm 174 pivoted to an upstanding bracket 175 on the top side of the frame 172. The arm 174 carries an adjustable pressure shoe 176 which engages the end of one of the channel members 162 to thus hold the cartridge securely to the frame 172. The arms 174 of the clamps are operated by means of bifurcated links 177 pivoted at their bottom ends to the brackets 175, and intermediate links 180 pivotally attached to the arms 174 at their lower ends and to the top of the bifurcated links 177 at their top end. The clamps 173 may be jointly operated by means of a connecting bar 181 extending between the two bifurcated links 177 of the clamps.

Figure 9:
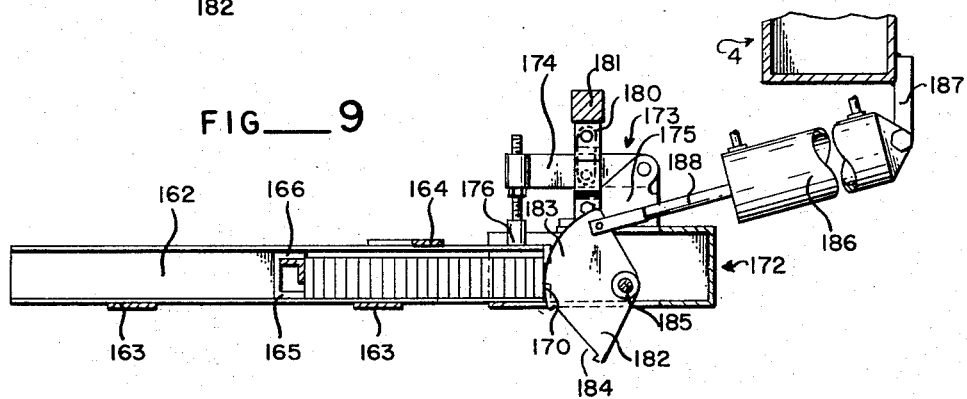
FIG. 9 is a cross sectional view taken along lines 9—9 of FIG. 2.
Figure 11:
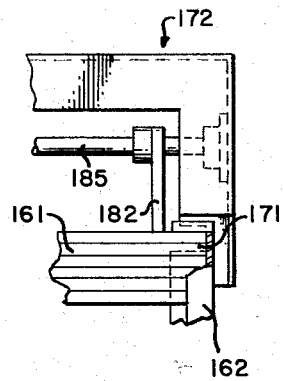
FIG. 11 is a fragmentary plan view taken along lines 11—11 of FIG. 8.

The slats 161 are dispensed one at a time on each side of the conveyor by means of discharge operators in the form of sector plates 182, each having a curved surface 183 including a notched portion 184. The operators 182 are keyed or otherwise fixed to a rotatable shaft 185 suitably journaled in the channel frame 172 as shown in FIGS. 9 and 11. A double acting fluid motor 186 is pivoted to a bracket 187 carried by the chain guide member at one side of the conveyor and has its piston rod 188 pivotally connected to one sector plate 182 as shown in FIG. 9.

In operation, and assuming the position of the discharge operators 182 to be shown in FIG. 9; when the piston rod 188 is retracted, the sector plates 182 are pivoted upwardly and the notches 184 engage the last slat in the end of the cartridge. When the piston rod 188 is again extended, a slat 161 is carried downwardly out of the cartridge through the openings 171 in the bottom of the channels 162 and is caused to fall directly on the end of a stack of lumber below it. The energization and deenergization of the fluid motor 186 to deposit the slats between selected alternate layers of the stack will be presently explained in connection with the electrical controls for the device.

*Over end stacker*

An alternate form of lumber diverting apparatus and slat dropping mechanism is shown in FIGS. 19 through 22 with such alternate forms being especially adapted for over the end stacking from a conveyor system but also adapted for use in series with other sorter and stacker units within a conveyor system. It will be understood that the alternate form of diverting means may be used either at the end of any conveyor system and in conjunction with a series of diverter and stacker stations thus far described or in a system made up of the alternate diverting means to be described. For instance, the arrangement shown in FIGS. 19 through 22 may be installed in the conveyor system of the preferred embodiment directly after the conveyor section 2 shown in FIG. 2 or following one of its kind in combination with the gate apparatus described. The specific alternate embodiment is shown in simplified form because of its placement at the end of a conveyor system with no gate apparatus being shown.

Only one side of the end of the conveyor system is shown in FIGS. 19 and 20 and it will be understood that the structure now to be described will be identical for the other side of the end of the conveyor. As shown in FIG. 19, the conveyor terminates in the inclined slide members 190 which may actually be extensions of the inclined surfaces 8 of the chain guide members 4 of the preferred embodiment. It will be noted that the conveyor chain terminates short of the inclined members 190 and the individual boards 191, 191a, and 191b are allowed to merely slide by gravity down the inclined members 190 which may be provided with a nylon or Teflon surfacing member 192 to eliminate friction and allow the boards to slide freely.

Directly below each of the inclined slide members 190 is a stack receiving and supporting mechanism which may be identical with that described for the preferred embodiment, shown in FIG. 5, and including stack receiving arms 193 which are identical to the U-shaped channels 118 of FIG. 5. The mechanical operation of the stack receiving and supporting mechanism of the alternate form of the invention is identical to that of the preferred embodiment and will not be repeated.

Parallel housing or frame structures 194, which may correspond to the housing structure 32 of the preferred embodiment extend along the sides of the end of the conveyor and may be connected by any form of transverse bracing such as the channel iron brace 195 to provide a mounting means for certain elements to be described.

In order that the board 191 may slide smoothly over previously formed layers of the stack, a glide strap unit 196 is located on each side of the conveyor and directly in line with the receiving arms 193 of the stack forming unit. The details of structure and the mode of operation of the glide strap units shown in FIG. 20 are identical with that shown in FIG. 3 in connection with the preferred embodiment. The units 196 may be operated by means of a rack, pinion and chain arrangement, not shown, to retract and extend the glide strap 197 within the tubular guide 198. With this arrangement, the glide strap 197 is either extended or retracted in relation to the receiving arms 193, as will be described.

Double acting fluid cylinders 200 are located on each side of the end of the conveyor directly above the end of the inclined slide members 190 and are securely fixed to the cross brace 195 by means such as the bolts 201. Each of the fluid cylinders 200 includes a piston rod 202 having a pressure shoe 203 on its bottom end for holding a board such as the board 191a to the surface of the inclined slide members 190 when the piston rods are in the extended position shown by the dotted lines in FIG. 19. In addition to the structure described, one side of the end of the conveyor includes a switch operating arm 204, positioned to be contacted by each board which slides down the incline 190, and a second switch operating arm 205 so placed as to contact each board which slides onto the surface of the receiving arms 193. The switch arms 204 and 205 may be mounted on the side of the frame structure 194 as shown in FIG. 20 and connected to suitable electrical switches later to be described. The switch arms 204 and 205 serve to control the actuation of the fluid motors 200 for clamping the boards to the slide 190, the fluid cylinders for retracting and extending the glide straps 197, the incremental lowering of the receiving arms 193 and the dispensing of slats between preselected alternate layers of the stack being formed, in a manner to be described in connection with the electrical system of the device. In general, the boards such as 191, 191a and 191b are allowed to freely slide down the incline 190 and onto the receiving arms 193 until a complete layer is formed on the receiving arms. On the completion of a full layer, the clamping shoes 203 are brought into engagement with the last board on the slide 190 to hold the board and all succeeding boards until the receiving arms 193 are lowered to allow the accumulation of the next layer of boards and until the glide straps 197 have been retraced and again extended to cover the layer just formed. After these functions have been electrically accomplished, the clamping shoes 203 are again raised allowing the boards to freely slide onto the previously formed layer to form the next succeeding layer. This cycle is repeated until the entire stack has been formed and removed.

The alternate embodiment of slat dropping mechanism is in the form of a permanently installed slat holding frame comprising spaced upright channels 207 which may be permanently fixed to any portion of the rigid frame of the conveyor system such as the cross brace 195 as shown in FIGS. 19 and 20. It will be understood that each side of the conveyor is equipped with a slat dropping unit and that additional intermediate units may also be employed. The two vertical channels 207 are open at the top for the reception of a plurality of slats 208 and the bottom ends of the two channel members 207 are interconnected by an angle iron 209. The bottom ends of the webs of both channel members 207 are provided with inwardly directed stop members 209, to prevent the slats from falling from between the channel members, and outwardly directed guide tabs 210 are provided on the lower ends of the inside legs of the channel members as shown in detail in FIG. 22. With this arrangement, the slat at the bottom of the stack is supported at its ends by the stop members 209 and is free to be removed laterally from the stack to the dotted line position shown in FIG. 22 and allowed to drop onto the stacks of lumber.

For the purpose of dispensing or removing the bottom slat 208 from the stack, a double acting fluid cylinder 211 is pivotally connected to the angle iron 209 and includes a piston rod 212 which is, in turn, pivotally connected to a rotatable crank arm 213 mounted at one end of the angle iron 209. One end of the crank arm 213 is connected to one arm of a second identical crank arm 214 by means of a tie rod 215. The crank arms 214 and 215 are connected in such a manner as to be operated in unison by the cylinder 211 for contacting the bottom slat 208 and moving it laterally to the dotted line position shown in FIG. 22 to be dropped onto the pile of lumber. The operation of the fluid cylinder 211 to seelctively deposit slats between alternate layers of the stack of lumber being formed will be explained later on in this specification in connection with electrical controls of the device.

*Electrical control system*

The electrical control system for the present invention including both the preferred embodiment of FIGS. 1 to 18 and the alternate embodiment of FIGS. 19 through 22 is shown as a single system in the functional electrical layout according to FIG. 23. Since the alternate embodiment of FIGS. 19 through 22 may be used concurrently with the preferred embodiment, the functional layout of FIG. 23 may be considered as a single system.

Referring now to FIG. 23, the electrical control system and operation of the various functions of the embodiment in FIGS. 1 through 18 will first be described starting with placement of the first board on the conveyor and assuming that the board is of such a length to engage the switch contact 81a of the inside switch 81 shown in FIG. 2. The various switches shown in the functional diagram of FIG. 23 bear identical reference numerals that appear for these switches in the various views of the drawings. It will also be noted that the sensing switch 81 is a normally open switch and sensing switch 82 is a normally closed switch as illustrated in FIG. 23. When a board strikes the switch arm 81a, the switch 81 closes energizing the relay G, a normally open contact of which closes to seal around the switch 81 and a normally closed contact of which opens to deenergize the gate solenoid 78 which results in the opening of the gate arms 22 as previously described in the specification. The gate arms will remain in the open position as described as long as the relay G is energized through the closed circuit. When a board of sufficient length contacts the switch arm 82a of the sensing switch 82, the normally closed switch 82 opens thus deenergizing the relay G allowing its contact to be returned to the normal position, again energizing the gate solenoid 78 which results in the closing of the gate arms 22 so that the longer board may continue along the conveyor system and not be diverted.

Considering now the control system for the operation of the glide straps, the dropping of spacer slats and the incremental lowering of the stack supporting mechanism; it will be noted that two conventional stepper units S1 and S2 are provided in the circuit. When the first board passing down the inclined surfaces 8 contacts the switch arm 157 of the stepper switch 156, the switch is tripped and advances the stepper S1 one unit through the normally closed contact of a ratchet relay RR. Each of the steppers S1 and S2 are preset by a single selector arrangement indicated generally by the numeral 216 to determine the number of steps required before the stepper unit will function to activate other components of the circuit to be described. The advancing of the stepper S1 one unit also serves to reset the stepper S2 to the zero position through a reset unit R2. As the first board continues its movement, it contacts the switch arm of the normally open switch 121 of the stack supporting mechanism and holds it in the closed position.

When the stepper S1 reaches its count as determined by the selector 216, which indicates the number of boards comprising a single layer of the stack 125, a circuit is completed closing the relay CR causing a change in position of the ratchet relay RA resulting in the breaking of the circuit to the stepper S1 and the completion of a circuit through the stepper S2. As indicated in the diagram, the change of position of the ratchet relay RR also reverses the valve position of the glide strap operating cylinders 143 and 148 to reposition the glide straps as previously described by means of the glide valve solenoid GVS. The change of position of the ratchet relay RR also closes a circuit through the slat dropping valve solenoid SDVS to retract the rod 188 of the fluid cylinder 186 to condition the slat dropping or dispensing mechanism for dispensing a slat 161 upon the next reversal of the solenoid SDVS.

Closing of the relay CR also energizes the solenoid HVS1 for actuating the fluid motor 104 through the closed switch 121, to lower the stack supporting arms 118 which continue to lower until the switch 121 moves out of contact with the top of the layer of boards to break the electrical circuit through the solenoid HVS1 and discontinue the downward movement of the stack supporting device. It will also be noted that the circuit provides a first manual switch 117 for selectively lowering the stack supporting device and a second manual switch 118 for selectively raising, through solenoid HVS2, the stack supporting device.

The above described operation repeats with the second stepper S2 which is now in circuit and first board of the layer serves to reset stepper number 1 through the reset unit R1. It will also be understood that upon the next reversing of the position of the slant dropper valve solenoid SDVS a spacer slat 161 will be dispensed and this will occur between every other layer of the stack being formed. The actuation of the reset R1 also drops the relay CR out until stepper S2 reaches its count.

The electrical control for the over-end stacker shown in FIGS. 19 through 22 operates as follows. In the beginning, it will be understood that the glide straps 197 are in the extended position and the cylinders 200 are holding the clamping shoes 203 in the retracted position shown in FIG. 19. As the boards initially slide down the incline 190 and complete one layer on the supporting arms 193, succeeding boards pile up until both the contact arms 204 and 205 are actuated to close the switches LS7 and LS6 respectively shown in the diagram in FIG. 23. With both switches LS6 and LS7 closed, a circuit is completed through a time delay relay TD which closes after a delay of approximately one second. The relay TD energizes a second off-delay relay TDO and the glide valve solenoid GS for retracting the glide straps 197. The relay TDO closes to operate the clamp valve solenoid CVS which causes the cylinders 200 to apply the shoes 203 to clamp the last board on the incline 190 in place.

The extreme retracted position of the glide straps 197 close a switch LS8 which, through the relay TD, energizes the solenoid HVS3 to actuate the fluid cylinder for lowering the stack supporting arms 193. The downward motion of the layer of boards on the arms 193 releases the switch arm 205 and again opens the switch LS6 which drops out the relay TD, stopping the lowering motion of the stack and reversing the glide solenoid GS to again extend the glide straps 197. The dropping out of the relay TD also drops out of the off-delay relay TDO which deenergizes after a few seconds reversing the clamp solenoid CVS to release the boards of the incline 190 allowing another layer to be built up. The alternate activation and deactivation of the switch LS8 alternately opens and closes the ratchet relay R through the energization of the relay S thus operating the slat dropping mechanism to deposit a slat for every other layer of the stack. A manual switch 220 may be utilized to selectively raise the receiving arms 193 after each stack is completed.

*Overall system*

FIG. 24 depicts a typical system for utilizing the sorter and stacker units of the present invention. The boards are fed from a planer or other source past an operator located at station 221 by means of a chain conveyor or the like 222 to be graded and trimmed to length. The operator at the station 221 decides how the board is to be most advantageously trimmed and controls the operation of a saw unit 223 to accomplish the trimming. At the same time, the operator at the station 221 also makes the decision as to the grade or other category the particular board being trimmed is to be assigned and, through a remote control system, feeds this information to the memory control device 224. After the trimmed board leaves the saw unit 223, it is carried forward by a chain conveyor or the like 225 and is transferred to one edge of the conveyor 225 by means of powered rollers 226 for passing the end of the board through a conventional end printer unit 227 for marking any desired identification on the board. The boards are than transferred to the opposite side of the conveyor 225 by means of powered rollers 228 for passing the opposite ends of the boards through the end printer 229 for the purpose described.

The memory control device 224 may be of any type known in the art, one form of which includes rotating discs which are synchronized with the speed of the conveyor. Information as to the grade or other category of a particular board may be fed in by an operator at the station 221 and the device 224 will give a signal to control an operation to be performed at a give spot in the conveyor system according to the information previously fed to it. The memory device 224 may thus be utilized to control a grade marking unit 230 for identifying the grade on the board according to the decision made at the station 221 and will also be utilized to control the operation of the multiple gate sorter and stacker arrangement shown in FIG. 24.

By way of example, three conveyor lines have been illustrated with each conveyor line including three sorter and stacker units. All of the gate arms 22a are in alignment and will operate concurrently and likewise the second row of gates 22b are designed to operate in unison. The last diverter station for over-the-end stacking includes the hold down cylinder arrangement 200 which functions as previously described. In addition, rows of contact switches are provided in front of each line of gates and will be usually from one to two feet apart for sensing the sensing the length of the lumber approaching the line of gates. For instance, the first line of gates shown may be preset to open upon the approach of six foot length boards to remain closed if the board exceeds this length. Likewise succeeding rows of gates may be set to handle different lengths of boards.

The memory device 224 operates to add a second function to the ability to sort lumber so that the lumber is separated for instance according to length and grade. To illustrate, the first line of gates 22a may be preset to handle 6 ft. length boards of a first particular grade and the second line of gates may be preset also to handle 6 ft. boards but of a second particular grade. Since the grade information has been fed into the memory device from the station 221, the memory device, being synchronized with the speed of the conveyors, may be used to cause the operation of a line of gates only if the approaching board is of the proper grade for the stack being formed. In this manner a board 6 ft. in length but of the second particular grade mentioned would not cause the opening of the first line of gates 22a but would continue to the second line of gates 22b where it would be allowed to be diverted to the stack containing 6 ft. length boards of the second designated class. It will be understood, of course, that the system shown in FIG. 24 is by way of example to illustrate an entire system suitable for utilizing the invention of the present device and in no way limits the details or applications of the present invention.

It will be readily apparent to those skilled in the art that the present invention provides novel and useful improvements in lumber sorter and stacker apparatus of the character described. The mechanisms, arrangement and types of structural components utilized within this invention may be subjected to numerous modifications well within the purview of this invention and applicants intend only to be limited to a liberal interpretation of the specification and appended claims.

Having thus described the invention, what is claimed as new and desired by Letters Patent is:

1. A lumber sorter and stacker device comprisng in combination; an in-line conveyor system including at least first and second conveyor sections, a common drive means for said sections, diverter gate means between said conveyor sections having a closed position for directing boards from said first section to said second section and an open position for allowing said boards to discharge from said first conveyor section, means to operate said gate means in response to the approach of boards of a given classification, a board receiving apparatus for receiving individual boards discharged from said first conveyor section, said receiving apparatus including inclined spaced support surfaces for forming layers of boards as they are discharged, means for lowering said support surfaces after the formation of a complete layer of boards to form a stack, and a glide device for facilitating the formation of individual layers comprising, first and second sets of flexible glide straps, and means responsive to the complexion of each single layer of boards for alternately extending and retracting said first and second sets of straps, whereby one set of straps is always extended across the stack on top of the last complete layer formed and beneath the layer of boards being formed.

2. The combination according to claim 1 wherein, said diverter gate means comprises laterally spaced gate arms bridging said conveyor sections, endless conveyor means carried on said arms, means to drive said endless conveyor means from said common drive means, means to mount said gate arms for movement between said open and closed positions about a horizontal axis and said means for operating said gate means comprises, sensing means for sensing the approach of a board of a given length, and power transmission means responsive to said sensing means to transfer the drive from said common drive means to said gate arms to rotate the arms between the open and closed positions 3. The combination according to claim 1 wherein, said board receiving apparatus comprises vertically inclined support members, means for mounting said support surfaces on said members for vertical reciprocation with said surfaces extending between said first conveyor section and said support members and being inclined downwardly away from said first conveyor section, electrical stepping means carried by said first conveyor section for sensing the discharge of a predetermined number of boards to form a single layer, said means for lowering said support surfaces being responsive to said stepping means, and means for limiting the lowering to one board thickness, whereby successive layers are accumulated to form a stack.

4. The combination according to claim 1 wherein said first and second sets of glide straps are mounted on the discharge end of said first conveyor section in alignment with said support surfaces and tubular guide means surrounding each of said flexible glide straps for guiding the movement thereof.

5. The combination according to claim 1 including, dispensing means located above said stack for depositing a plurality of spaced tie members between preselected layers of boards at right angles to said boards during formation of said stack.

6. The combination according to claim 5 wherein said dispensing means comprises; cartridge means mounted on each side of said second conveyor above said stack for holding a plurality of tie members, discharge operator means attached to each cartridge for dispensing one tie member at a time on each side of said stack, and means for actuating said discharge operators to place tie members at predetermined positions in the stack during formation.

7. A lumber sorter and stacker device comprising in combination; a conveyor for moving individual boards, means operating in conjunction with said conveyor for diverting selected boards to a discharge position, stocker means to receive boards discharged from said conveyor and to accumulate said boards in individual generally planar layers forming a stack, a glide device for facilitating the formation of layers, said glide device including at least one reciprocable glide strap, and means for extending said strap across the stack on top of the last complete layer formed and beneath the layer being accumulated, said strap being supported by said last complete layer and extending in a plane substantially parallel therewith.

8. The combination according to claim 7 wherein, said conveyor includes first and second conveyor sections with a common drive means, and said means for diverting selected boards comprises; a diverter gate having laterally spaced gate arms bridging said conveyor sections, endless conveyor means carried on said arms, means to drive said endless conveyor means from said common drive means, means to mount said gate arms for movement between an open and closed position about a horizontal axis, and means for operating said gate means comprising, sensing means for sensing the approach of a board of a given length, and power transmission means responsive to said sensing means to transfer the drive from said common drive means to said gate arms to rotate the arms between the open and closed positions.

9. The combination according to claim 7 including, dispensing means located above said stack for depositing a plurality of spaced tie members between preselected layers of boards at right angles to said boards during formation of said stack.

10. In a conveyor system having first and second spaced conveyor sections with a discharge station therebetween, and drive means for said section, a diverter gate apparatus comprising; spaced gate arms pivotally mounted on said second conveyor section and movable between an upwardly inclined open position and a horizontal closed position, said arms bridging said first and second conveyor sections, endless conveyor means carried by said arms, means for driving said endless conveyor from said drive means, means carried by said first conveyor section for sensing the approach of an article to be diverted, and mechanical power transmission means responsive to said sensing means for connecting said drive means to said gate arms to rotate the arms between the open and closed positions, whereby the movement of said gate arms is coordinated with the speed of said conveyor sections.

11. The combination according to claim 10 wherein, said mechanical means comprises; a constantly rotating shaft driven by said drive means, a second shaft connected to rotate said gate arms and means for selectively coupling said shafts in response to said sensing means.

12. In a lumber stacking apparatus for stacking individual boards received from a fixed delivery station, a board receiving device comprising, a vertically inclined support member spaced from said station, a board support surface, means for mounting said support surface on said member for vertical reciprocation with said surface being inclined downwardly away from said station, means for selectively lowering said surface, means mounted adjacent said station for sensing the discharge of a predetermined number of boards to form a single layer on said surface, said means for lowering said surface being responsive to said sensing means for lowering said surface after the completion of a complete layer, means for limiting the lowering to one board thickness, a glide strap device including reciprocable glide straps, and means responsive to the completion of each single layer of boards for extending and retracting said glide straps across the stack on top of the last complete layer formed and beneath the layer being formed, said straps being supported by said last complete layer and extending in a plane substantially parallel therewith.

13. In combination with means for forming a stack of lumber by sliding individual boards across the stack to form layers, a glide strap mechanism comprising; at least one reciprocable glide strap, and means responsive to the completion of each layer of boards for alternately extending and retracting said strap, across the stack on top of the last complete layer formed and beneath the layer being formed, said strap being supported by said last complete layer and extending in a plane substantially parallel therewith.

14. In combination with means for depositing individual layers of boards to form a stack, a device for depositing tie members between preselected layers during formation of the stack comprising; a plurality of elongated flat tie members, horizontal frame means for supporting said tie members above said stack, said frame including biasing means to urge said members to one end of said frame and an opening to allow removal of said members one at a time from said one end, rotatably mounted discharge operators having notches for engaging the member adjacent said opening, and means to rotate said discharge operators to remove a tie member at predetermined intervals.

15. In combination with means for depositing individual layers of boards to form a stack, a device for depositing tie members between preselected layers during formation of the stack comprising; a plurality of elongated flat tie members, vertical frame means for supporting said tie members above said stack, said frame means including an opening at the bottom thereof and along one side to allow removal of said members one at a time, in a lateral direction, a plurality of rotatably mounted crank arms adjacent the bottom of said frame and means to rotate said arms in a horizontal direction to contact and remove said tie members from said opening.

16. A lumber sorter and stacker device comprising in combination; a conveyor system including at least first and second conveyor sections, drive means for said sections, diverter gate means between said conveyor sections having a closed position for diverting boards from said first section to said second section and an open position for allowing said boards to discharge from said first conveyor section, means to operate said gate means in response to the approach of boards of a given classification, a board receiving apparatus for receiving individual boards discharged from said first conveyor section, said receiving apparatus including inclined spaced support surfaces for forming layers of boards as they are discharged, means for lowering said support surfaces after the formation of a complete layer of boards to form a stack, and a glide device for facilitating the formation of individual layers comprising, flexible glide straps, and means responsive to the completion of each single layer of boards for alternately retracting and extending said straps, whereby said straps maybe extended across the stack on top of the last complete layer formed and beneath the layer of boards being formed.

17. A lumber sorter and stacker device comprising in combination; a conveyor system, means for diverting selected boards from said system, a stacker device including means for receiving boards diverted from said conveyor and forming a stack, and means for locating at least one flexible glide strap beneath each successive layer of said stack before its formation and removing said strap after formation of the layer, said strap being movable in a plane substantially parallel with the layers of said stack.

18. A lumber stacker device comprising in combination, means for receiving individual boards from a conveyor and forming a stack by sliding individual boards across one another to form layers, and means for locating at least one glide strap beneath each successive layer of said stack before its formation and removing said strap after formation of the layer, said strap being movable in a plane substantially parallel with the layers of said stack.

19. A lumber sorter and stacker device comprising in combination; a conveyor for moving individual boards, a board receiving apparatus for receiving individual boards discharged from said conveyor, said receiving apparatus including inclined support surfaces for forming layers of boards as they are discharged, a downwardly inclined slide surface extending between said conveyor and said support surfaces, means for clamping the next succeeding board to said slide surface upon completion of a layer of boards on said support surfaces, means for lowering said support surfaces a distance of the thickness of one layer after the formation of each completed layer of boards to form a stack, time delay means responsive to the lowering of said support surfaces for deactivating said clamping means, a glide device for facilitating the formation of layers, said glide device including reciprocable glide straps, and means responsive to the completion of each layer of boards for extending certain of said straps across the stack on top of the last complete layer formed and beneath the layer of boards being formed, said straps being supported by said last complete layer and extending in a plane substantially parallel therewith.

20. A lumber sorter and stacker device comprising in combination; a conveyor for moving individual boards, means to receive boards discharged from said conveyor and to accumulate said board in individual layers forming a stack, inclined slide surfaces extending between said conveyor and said means to receive boards, means for clamping the next succeeding board to said slide surface upon completion of a layer of boards on said receiving means, means for lowering said receiving means after the formation of each complete layer of boards, means for clamping the next succeeding board to said slide surface upon completion of a layer of boards, time delay means responsive to the lowering of said support surface for deactivating said clamping means, a glide device for facilitating the formation of layers, said glide device including reciprocable glide straps, and means for extending said straps across the stack on top of the last complete layer formed and beneath the layer being accumulated, said straps being supported by said last complete layer and extending in a plane substantially parallel therewith.

21. A lumber sorter and stacker device comprising in combination; a conveyor for moving individual boards including first and second conveyor sections with a common drive means, a diverter gate for diverting selected boards to a discharge position, said gate having laterally spaced gate arms bridging said conveyor sections, endless conveyor means carried on said arms, means to drive said endless conveyor means from said common drive means, means to mount said gate arms for movement between an open and closed position about a horizontal axis, and means for operating said gate means comprising, sensing means for sensing the approach of a board of a given length, and power transmission means responsive to said sensing means to transfer the drive from said common drive means to said gate arms to rotate the arms between the open and closed positions, a board receiving apparatus for receiving individual boards discharged from said conveyor, said receiving apparatus including inclined support surfaces for forming layers of boards as they are discharged, means for lowering said support surfaces the distance of the thickness of one layer after the formation of each complete layer of boards to form a stack, a glide device for facilitating the formation of layers, said glide device including reciprocable glide straps, and means responsive to the completion of each layer of boards for extending certain of said straps across the stack on top of the last complete layer formed and beneath the layer of boards being formed.

22. In a conveyor system having a diverter gate means operable by a driven shaft when coupled to a coaxial conveyor drive shaft, a device for selectively connecting the drive shaft to the driven shaft through a predetermined angle of rotation comprising; a disk fixed to said drive shaft, a recess on the face of said disk, an axially slidable key mounted on said driven shaft, means normally biasing said key into engagement with said recess, a yoke member having first and second cam members thereon spaced apart a predetermined arcuate distance relative to the axis of the driven shaft, means to mount said yoke for pivotal movement in a plane normal to the axes of said shafts with either one of said first and second cam members intersecting the path of said slidable key, means on said key coacting with either said first and second cam members to cause said key to be withdrawn when contacted thereby, and means to selectively pivot said yoke, whereby one of said cam members is always in the path of said key to limit the rotation of the driven shaft through said predetermined arcuate distance upon pivoting of said yoke.

References Cited by the Examiner

UNITED STATES PATENTS

| | | | |
|---|---|---|---|
| 1,188,137 | 6/1916 | Baker et al. | 214—6 |
| 2,065,673 | 12/1936 | Fay | 214—6 |
| 2,517,473 | 8/1950 | Filarski | 192—29 |
| 3,080,052 | 3/1963 | Hanbury | 209—88 X |

ROBERT B. REEVES, *Primary Examiner.*